United States Patent
Riemer et al.

[11] Patent Number: 6,068,565
[45] Date of Patent: May 30, 2000

[54] CONTINUOUSLY VARIABLE SPEED TRANSMISSION

[75] Inventors: Peter Riemer, Bühl; Oswald Friedmann, Lichtenau, both of Germany

[73] Assignee: LuK Getriebe-Systeme GmbH, Buhl/Baden, Germany

[21] Appl. No.: 09/198,711

[22] Filed: Nov. 24, 1998

[30] Foreign Application Priority Data

Nov. 25, 1997 [DE] Germany .............................. 195 52 079

[51] Int. Cl.$^7$ .............................. F16H 59/00; F16H 61/00
[52] U.S. Cl. .................................................. 474/18; 474/28
[58] Field of Search ...................... 474/8, 18, 28

[56] References Cited

U.S. PATENT DOCUMENTS

| | | | |
|---|---|---|---|
| 5,046,991 | 9/1991 | Friedmann | 474/18 |
| 5,169,365 | 12/1992 | Friedmann | 474/18 |
| 5,217,412 | 6/1993 | Indlekofer et al. | 474/69 |
| 5,295,915 | 3/1994 | Friedman | 474/18 |
| 5,667,448 | 9/1997 | Friedmann | 474/18 |
| 5,711,730 | 1/1998 | Friedman et al. | 474/18 |
| 5,803,846 | 9/1998 | Yamada et al. | 474/18 |
| 5,937,729 | 8/1999 | Spiess et al. | 474/28 |
| 5,941,787 | 8/1999 | Imaida et al. | 474/28 |
| 5,951,421 | 9/1999 | D'Herripon | 474/18 |
| 5,967,918 | 10/1999 | Knapp et al. | 474/28 |
| 5,971,876 | 10/1999 | Spiess et al. | 474/28 |

FOREIGN PATENT DOCUMENTS

| | | |
|---|---|---|
| 28 28 347 C2 | 10/1982 | Germany . |
| 35 38 884 A1 | 5/1987 | Germany . |

*Primary Examiner*—Thomas R. Hannon
*Assistant Examiner*—Matthew A. Kaness
*Attorney, Agent, or Firm*—Darby & Darby

[57] ABSTRACT

A continuously variable speed transmission has two adjustable sheaves and an endless chain or belt which is trained over and transmits torque between the sheaves. One of the sheaves can be driven by a prime mover, and the other sheave can drive a torque receiving device. Each sheave has a shaft, a first flange which is fixed to the shaft, and a second flange which is movable axially of the shaft toward and away from the first flange. The shaft portion between the flanges of at least one of the sheaves is located in the path of one or more sprays of a cooling and/or lubricating fluid which flows axially of the shaft and along the confronting conical surfaces of the flanges. The spray or sprays are supplied by the nozzle(s) of a conduit which receives fluid from a pump in the hydraulic system of the transmission.

15 Claims, 3 Drawing Sheets

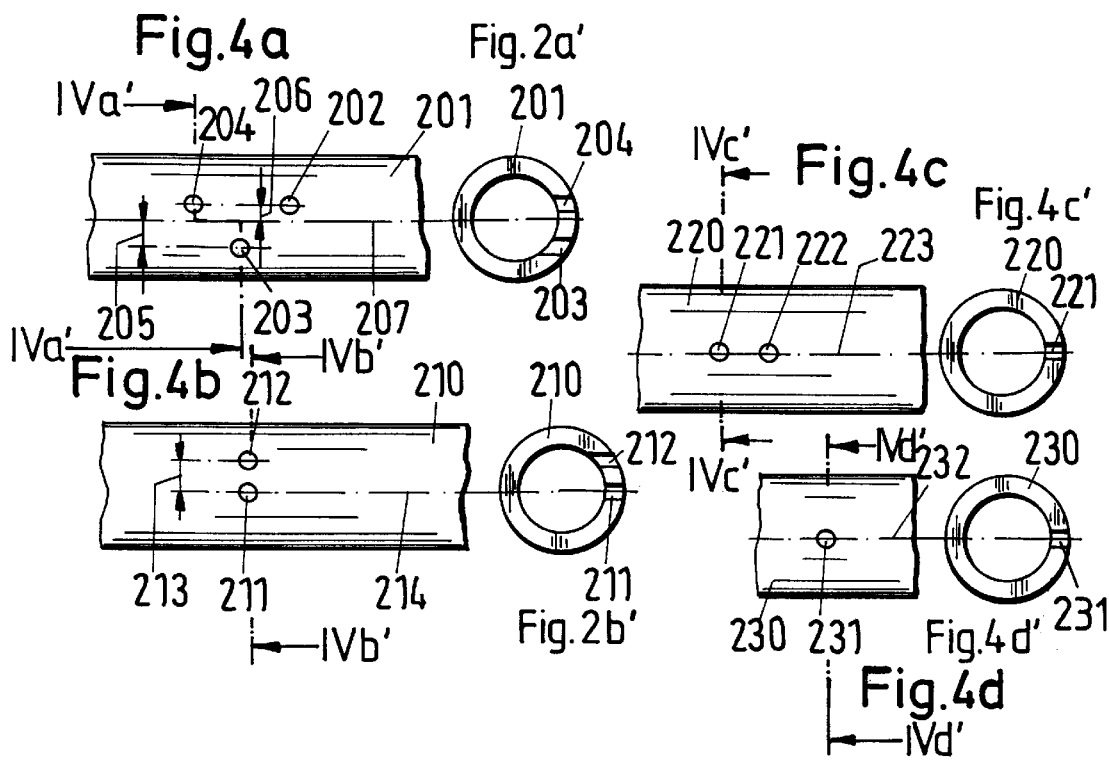
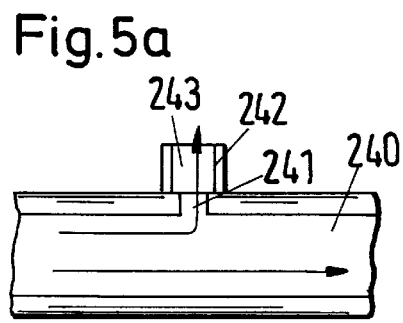
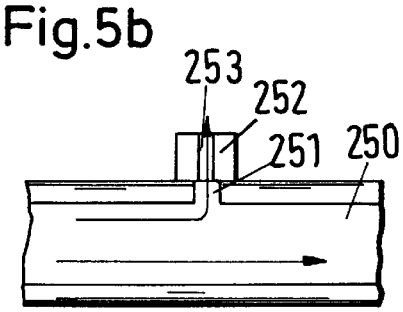
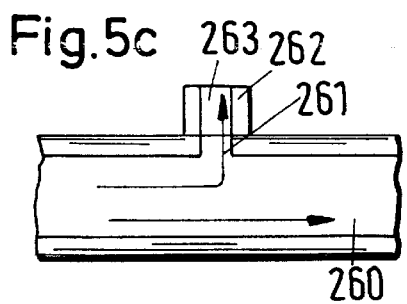

CONTINUOUSLY VARIABLE SPEED TRANSMISSION

BACKGROUND OF THE INVENTION

The Present invention relates to transmissions in general, and more particularly to improvements in continuously or infinitely variable speed transmissions of the type disclosed, for example, in commonly owned U.S. Pat. No. 5,667,448 granted Sep. 16, 1997 to Oswald Friedmann for "POWER TRAIN".

A continuously or infinitely variable transmission of the character to which the instant invention pertains comprises a first adjustable rotary sheave or pulley having a shaft which is arranged to be driven by a prime mover, e.g., by the rotary output element, such as a crankshaft or a camshaft, of an internal combustion engine in the power train of a motor vehicle, a second adjustable rotary sheave or pulley having a shaft which can transmit torque to a friction clutch, a hydrokinetic torque converter or another torque receiving constituent of the power train in the motor vehicle, and at least one endless flexible element (such as a belt, particularly a V-belt, or a chain) which is trained over and transmits torque between the two adjustable sheaves, Each sheave is further combined with or incorporates at least one adjusting system (such as a hydraulically or pneumatically operated cylinder and piston unit) which is designed to move one of the flanges axially of the respective shaft toward or away from the other flange in order to vary the extent of frictional engagement between the flanges and adjacent arcuate portion of the endless flexible element and/or to change the ratio of the transmission.

In addition to the aforementioned U.S. Pat. No. 5,667,448 to Friedmann, transmissions of the above outlined character are disclosed in German patent No. 28 28 347, in published German patent applications Serial Nos. 35 38 884, 40 36 683, 42 01 692 and 42 34 294, and in U.S. Pat. No. 4,046,991 (granted Sep. 10, 1991 to Oswald Friedmann for "CONTINUOUSLY VARIABLE SPEED TRANSMISSION"), U.S. Pat. No. 5,169,365 (granted Dec. 8, 1992 to Oswald Friedmann for "POWER TRAIN"), U.S. Pat. No. 5,217,412 (granted Jun. 8, 1993 to Norbert Indlekofer and Oswald Friedmannn for "CONTINUOUSLY VARIABLE SPEED TRANSMISSION"), U.S. Pat. No. 5,295,915 (granted Mar. 22, 1994 to Oswald Friedmann for "CONTINUOUSLY VARIABLE SPEED TRANSMISSION"), and U.S. Pat. No. 5,711,730 (granted Jan. 27, 1998 to Oswald Friedmann and Armin Veil for "TORQUE MONITORING APPARATUS"). The disclosures of all of the above enumerated patents and patent applications are incorporated herein by reference.

It is considered desirable to apply films or coats of a fluid, such as oil, to those (normally conical) surfaces of the flanges forming part of the sheaves in continuously variable speed transmissions of the above outlined character which come into repeated contact with the endless flexible element when the transmission is in actual use. The purpose of the fluid is to withdraw heat when the transmission is in use and to thus seek to establish a desired (i.e., at least partially satisfactory) frictional engagement between the cooled flanges of the sheaves and the adjacent arcuate portions of the torque transmitting endless flexible element or elements.

As a rule, the fluid coolant is supplied by way of channels or grooves which are provided in the shafts for the flanges of the respective sheaves. A drawback of such conventional proposals is that the normally conical surfaces of the flanges (i.e., the surfaces which repeatedly contact the endless flexible element or elements) are not adequately cooled because they do not receive the required quantities of coolant in actual use of the continuously variable speed transmission and/or because the distribution of supplied coolant is not uniform.

On the other hand, the trend in the automobile industry is toward the construction and assembly of motor vehicles wherein the power train need not undergo any maintenance, or necessitates a minimum of servicing, during the entire useful life of the motor vehicle. For example, it is well known to design, construct and assemble the friction clutches in such a way that they need not be serviced at all during the useful life of the motor vehicle. Such friction clutches can be utilized in conjunction with (for example, they can receive torque from) continuously variable speed transmissions of the type to which the present invention belongs.

OBJECTS OF THE INVENTION

An object of the instant invention is to provide a cotinuously or infinitely variable speed transmission wherein the cooling of the sheaves is more satisfactory than the cooling in accordance with heretofore known proposals.

Another object of the invention is to provide the transmission with a novel and improved coolant supplying and distributing arrangement which is designed in such a way that it does not or need not weaken the shafts of the sheaves.

A further object of the invention is to provide a continuously variable speed transmission wherein the flanges of the sheaves can be cooled in a simple but highly efficient manner.

An additional object of the invention is to provide a novel and improved method of ensuring the establishment of an optimal (or at least highly satisfactory) frictional engagement between the flanges of the sheaves and the adjacent surfaces of the endless torque transmitting flexible element or elements.

Still another object of the invention is to provide a novel and improved cooling arrangement which can be embodied in existing continuously variable speed transmissions as a superior substitute for heretofore known and utilized arrangements or as a means for cooling the flanges of the sheaves of transmissions which are without cooling means.

Another object of the invention is to provide a continuously or infinitely variable speed transmission wherein the cooling arrangement need not be equipped with a discrete source of coolant.

A further object of the invention is to provide a novel and improved method of cooling, lubricating and establishing predictable and optimal or highly satisfactory circumstances for frictional engagement of the flanges of at least one of the rotary adjustable sheaves with the endless flexible torque transmitting element or elements which is or are trained over the sheaves.

An additional object of the invention is to provide a novel and improved continuously variable speed transmission employing one or more sheaves provided with the above outlined cooling arrangement.

Still another object of the invention is to provide a power train which embodies the just outlined continuously or infinitely variable speed transmission.

A further object of the invention is to provide a continuously variable speed transmission wherein the flanges of at least one of the adjustable sheaves or pulleys can be cooled, lubricated and their friction characteristics enhanced in a simple and economical manner by resorting to readily available fluid media.

An additional object of the invention is to provide a simple and economical but highly reliable method of prolonging the useful lives of continuously or infinitely variable speed transmissions of the type employing adjustable sheaves and belts or chains trained over such sheaves.

SUMMARY OF THE INVENTION

The invention is embodied in a transmission of the type known as continuously or infinitely variable speed transmission. The improved transmission comprises a first adjustable rotary sheave which can receive torque from a suitable prime mover (such as the internal combustion engine in the power train of a motor vehicle), and a second adjustable sheave which can receive torque from the first sheave by way of at least one endless flexible element (such as a belt or a chain) which is trained over the two sheaves. Each of the two sheaves has a shaft and two flanges which are non-rotatably connected to the respective shaft, and each of the two shafts has a portion between the respective flanges. The transmission further comprises at least one adjusting unit for each of the sheaves, and such units are regulatable to vary the magnitude of the torque being transmitted between the at least one endless flexible element and the sheaves, particularly by moving one flange of the respective pair toward or away from the other flange. In accordance with a feature of the invention, the improved transmission further comprises means for supplying a fluid to at least one of the shafts between the flanges of the respective sheave.

The fluid supplying means can comprise means for delivering fluid to both shafts between the flanges of the respective sheaves.

In accordance with a presently prefered embodiment, the fluid supplying means comprises at least one fluid conveying conduit having at least one orifice which is arranged to direct fluid toward the at least one shaft. Such fluid supplying means can further comprise means for determining (i.e., selecting or regulating) the velocity of fluid which issues from the at least one orifice to impinge upon the at least one shaft. If the fluid supplying means comprises means for conveying fluid to both shafts between the flanges of the respective sheaves, such conveying means can comprise at least one fluid discharging orifice for each shaft and each orifice can be oriented to direct fluid against the respective shaft. Such fluid supplying means can further comprise means for determining the velocity of fluid which issues from at least one of the orificies and impinges upon the respective shaft. The arrangement can be such that the conveying means comprises a plurality of orifices for at least one of the shafts. One or more orifices can be associated with means for determining the velocity of the fluid which issues from the respective orifice or orifices.

Each orifice (or at least one orifice of several orifices) can have a first cross-sectional area, and the fluid supplying means can further comprise means (e.g., a tubular extension, a diaphragm or the like) for directing fluid from such orifice toward the respective shaft. The cross-sectional area of the fluid flow directing means (e.g., of a passage or channel in such fluid flow directing means) can be smaller or larger than or at least substantially identical with the cross-sectional area of the respective orifice. This renders it possible to select the velocity and/or the configuration of the spray or sprays of fluid which contacts the respective shaft or shafts.

The conduit or conduits of the fluid supplying means receive fluid (preferably at a variable pressure) from a suitable source, e.g., at least one pump.

The fluid can constitute a coolant and/or a lubricant. For example, the shaft or shafts of the sheave or sheaves can be contacted by sprays of oil. Such spray or sprays can contact the respective shaft or shafts midway between the respective pair or pairs of flanges when the transmission is set to transmit torque of a predetermined magnitude, e.g., a torque which is at least substantially midway between the maximum value and zero.

The novel features which are considered as characteristic of the invention are set forth in particular in the appended claims. The improved transmission itself, however, both as to its contruction and the modes of assembling and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 4a is a fragmentary elevational view of a conduit forming part of the fluid supplying unit and having three orifices in a predetermined distribution with reference to a plane including the axis of the conduit;

FIG. 4a' is a schematic transverse sectional view substantially as seen in the direction of arrows from the line IVa'—IVa' in FIG. 4a;

FIG. 4b is a view similar to that of FIG. 4a but showing two orifices in a different distribution relative to a plane including the axis of the conduit;

FIG. 4b' is a schematic transverse sectional view substantially as seen in the direction of arrows from the line IVb'—IVb' of FIG. 4b;

FIG. 4c is a view similar to that of FIG. 4a or 4b but showing two orifices in a third distribution relative to a plane including the axis of the conduit;

FIG. 4c' is a schematic transverse sectional view substantially as seen in the direction of arrows from the line IVc'—IVc' of FIG. 4c;

FIG. 4d is a view similar to that of FIG. 4a, 4b or 4c but showing a single orifice with a center in the plane including the axis of the conduit;

FIG. 4d' is a schematic transverse sectional view substantially as seen in the direction of arrows from the line IVd'—IVd' of FIG. 4d;

FIG. 5a is a fragmentary sectional view of a conduit having an orifice serving to discharge fluid into a tubular extension having a passage with a cross-sectional area greater than that of the orifice;

FIG. 5b is a similar sectional view but showing an extension with a passage having a cross-sectional area smaller than that of the orifice in the conduit; and FIG. 5c is a fragmentary sectional view similar to those shown in FIGS. 5a and 5b except that the orifice has a cross-sectional area which matches or closely approximates that of the tubular extension.

DESCRIPTION OF PREFERRED EMBODIMENTS

Figure 1:
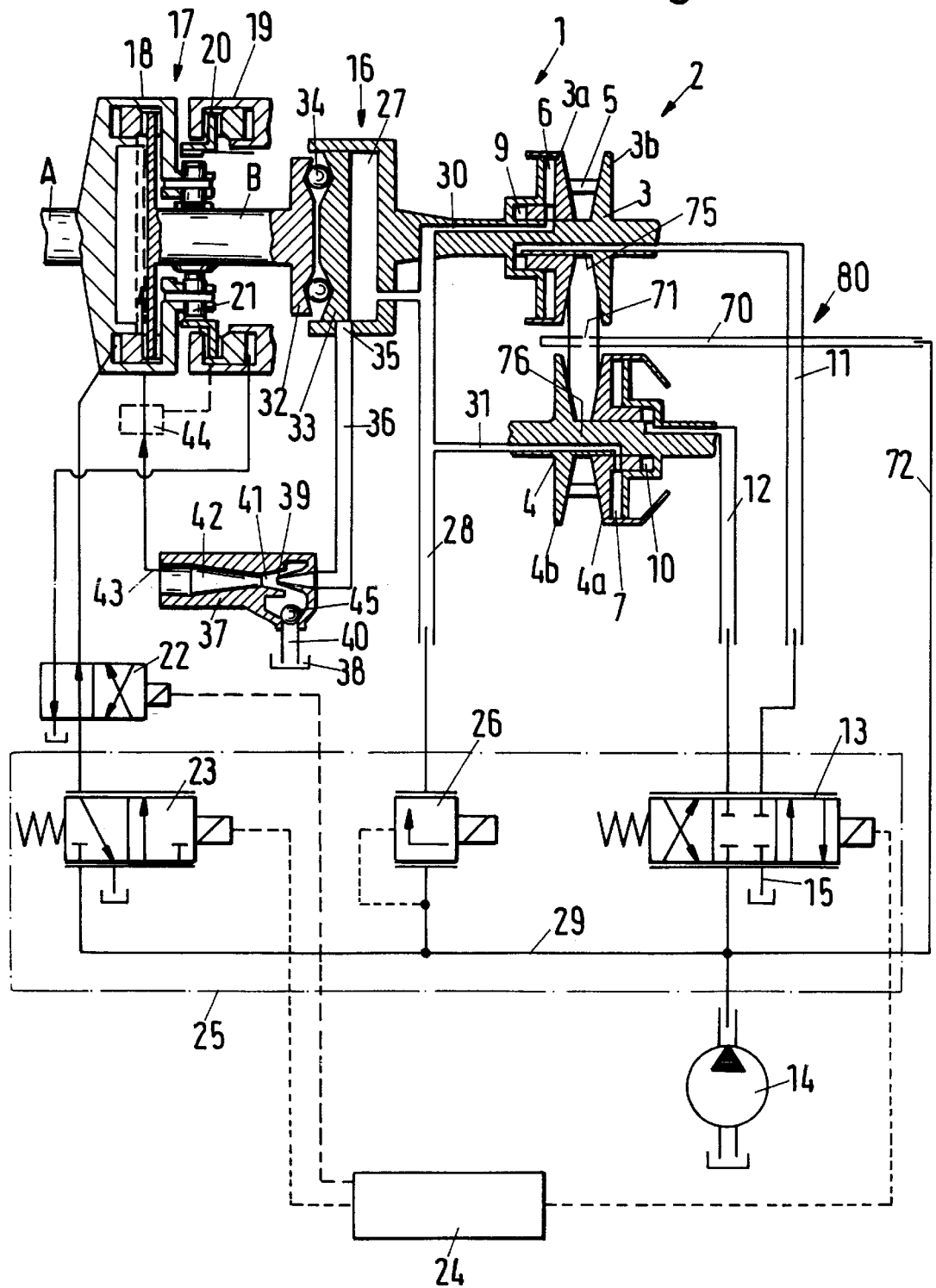
FIG. 1 is a schematic partly elevational and partly sectional view of a continuously variable speed transmission which is equipped with a fluid supplying system or unit embodying one form of the invention and being designed to supply sprays of a fluid to the shafts of both sheaves of the transmission.

FIG. 1 shows schematically a portion of a power train 1 which can be utilized in a motor vehicle and comprises a continuously or infinitely variable speed transmission 2 embodying one form of the present invention. The transmission 2 comprises a first adjustable sheave or pulley 3 having a shaft (see the shaft 112 in FIG. 2) which receives torque from an output shaft A of a prime mover (e.g., the shaft A can constitute the camshaft or the crankshaft of an internal combustion engine in the power train of the motor vehicle), and a second adjustable sheave or pulley 4 having a shaft (see the shaft 115 in FIG. 2) which can transmit torque to a torque receiving device (e.g., a friction clutch, noth shown) of the power train 1. The transmission 2 further comprises at least one endless flexible element 5 (such as a belt or a chain and hereinafter referred to as chain) which serves to transmit torque between the sheaves 3 and 4.

The sheave 3 comprises a first flange 3a which is axially movably but non-rotatably secured to the respective shaft, and a second flange 3b which is or which can be rigidly secured to (e.g., made of one piece with) the shaft. Analogously, the sheave 4 comprises an axially movable flange 4a and a second flange 4b which is rigid (e.g., of one piece) with the respective shaft.

The means for adjusting the flange 3a relative to the flange 3b (by moving the flange 3a axially of the respective shaft) comprises a fluid-operated (e.g., hydraulic) cylinder and piston unit 6 which can receive a pressurized fluid (such as oil) from a conduit 28 having an extension constituting a channel, bore or groove in the shaft of the sheave 3. Analogously, the unit 7 for adjusting the flange 4a relative to the flange 4b comprises a conduit 31 which branches off the conduit 28 and can comprise an extension in the form of a channel, bore or groove in the shaft of the sheave 4.

The purpose of the adjusting units 6, 7 is to select the extent of frictional engagement between the chain 5 and the adjacent conical surfaces of the respective flanges 3a, 3b and 4a, 4b. In other words, the units 6, 7 determine the extent of slip between the chain 5 on the one hand, and the flanges of the sheaves 3, 4 on the other hand.

The adjusting unit 6 operates in parallel with a third fluid-operated adjusting unit 9 which can shift the flange 3a of the sheave 3 axially of the respective shaft for the purpose of changing the ratio of the transmission 2, namely for changing the radial distance between the axis of the shaft of the sheave 3 and the locus of that arcuate portion of the chain 5 which is trained over the sheave 3. An analogous fourth fluid-operated cylinder-and-piston unit 10 operates in parallel with the unit 7 and serves to select the radial distance between the axis of the shaft of the sheave 4 and that arcuate portion of the chain 5 which is trained over such sheave.

The plenum chamber of the adjusting unit 9 receives a pressurized flid from a conduit 11 when the plenum chamber of the adjusting unit 10 is free to discharge fluid by way of a conduit 12, and vice versa. The RPM of the sheave 4 (relative to the RPM of the sheave 3) is reduced when the unit 10 causes the flange 4a to move nearer to the flange 4b while the unit 9 causes or permits the flange 3a to move away from the flange 3b, and vice versa.

The directions of fluid flow in the conduits 11, 12 are determined by a valve 13 which connects one of these conduits with the outlet of a pump 14 (or another suitable source of pressurized fluid) while the other conduit is connected with the sump 15. The valve 13 receives signals from an electronic control circuit 24 of the transmission 2. The outlet of the pump 14 is further connectable with the conduits 28, 31 by way of a conduit 29 and a pressure regulating valve 26.

The selection of a desired transmission ratio involves the establishment of an appropriate relationship between the pressures of fluid in the plenum chambers of the adjusting units 9 and 10. The transmission 2 further comprises a conventional hydromechanical torque sensor 16 which transmits at least some torque from the output shaft A of the prime mover to the shaft of the sheave 3. The sensor 16 can influence the pressure of fluid in the conduits 28 and 31, i.e., in the plenum chambers of the adjusting units 6 and 7. The connection between the output shaft A and the sensor 16 comprises a clutch assembly 17.

The assembly 17 comprises a starter clutch 18 and an optional direction changing unit 19; the latter is put to use when the motor vehicle is to be driven in reverse. The illustrated unit 19 comprises a brake or clutch 20 which can change the direction of rotation of an intermediate shaft B between the clutch assembly 17 and the sensor 16 by way of a planetary 21.

The starter clutch 18 and the brake or clutch 20 are hydraulically operated devices one of which receives fluid from the pump 14 and conduit 29 by way of a switchover valve 22 while the other of these clutches is connected with the sump (by way of the valve 22). The connection between the pump 14 (conduit 29) and the switchover valve 22 comprises a regulating valve 23 which receives signals from the control unit 24 and cooperates with the valve 22 to activate the clutch 18 or 19, e.g., to engage or disengage the clutch 18.

The control unit 24 has several inputs for signals denoting the changes of various parameters of the motor vehicle and certain constituents of the power train 1, such as the engine which includes or drives the shaft A and/or the transmission 2. The hydraulic controls 25 can constitute a block which includes the valves 13, 23 and 26.

The purpose of the pressure regulating valve 26 between the pump 14 and the sensor 16 is to ensure the establishment of certain minimum fluid pressure in the conduit 29 (i.e., upstream of the valves 13 and 23) even if the pressure at the sensor 16 is very low. The plenum chamber 27 of the sensor 16 can receive pressurized fluid from the outlet of the pump 14 via conduits 29, 28, and the conduit 28 communicates with the channels 30, 31 which, in turn, communicate with the chambers of the adjusting units 6, 7, respectively. Thus, the fluid pressure in the chambers of the cylinder-and-piston units 6, 7 is a function of fluid pressure in the chamber 27 of the sensor 16. The latter transmits torque from the intermediate shaft B to the shaft of the first sheave 3. The sensor 16 can be said to constitute or to act as a torque-regulated valve; it comprises an axially fixed rotary race 32 secured to the shaft B, an axially movable race 33 secured to the shaft of the sheave 3, and spherical or other suitable rolling elements or followers 34 between the confronting faces of the races 32, 33. Such confronting faces of the races 32, 33 have ramps which are tracked by the followers 34.

The outlet 35 of the chamber 27 of the sensor 16 is connected with the inlet of a jet pump 37 by a conduit 36. The effective cross-sectional area of the outlet 35 varies in dependency upon the axial position of the race 33, i.e., on the magnitude of the torque which is being transmitted between the races 32, 33 of the sensor 16. Thus, the magnitude of the torque being transmitted by the sensor 16 from the intermediate shaft B to the shaft of the sheave 3 influences the fluid pressures in the chamber 27, in the conduits 28, 30, 31, and hence in the chambers of the adjusting units 6, 7.

The pressure of fluid (such as oil) which flows from the chamber 27 via outlet 35 of the sensor 16 is relatively high, i.e., the energy of fluid flowing into the jet Pump 37 is normally very high. Such energy is put to use in the jet pump 37, namely to draw additional fluid from a reservoir 38 by way of a suction pipe 40; this additional fluid is used as a coolant and/or as a lubricant. It will be seen that the fluid entering the jet pump 37 via outlet of the conduit 36 acts as a propellant which causes the jet pump to draw additional fluid into a nozzle 41 upstream of a diffuser 42 which, in turn, is located upstream of the outlet 43 of the jet pump. The fluid which is supplied by the conduit 36 is accelerated at the conical orifice 39 with an attendant pronounced drop of pressure which entails the inflow of fluid from the reservoir 38 via suction pipe 40. The velocities of fluids supplied by the conduit 36 and suction pipe 40 are equalized at the nozzle 41, and the diffuser 42 selects the fluid pressure which is required or desirable at the outlet 43 of the jet pump 37.

The outlet 43 supplies fluid at a requisite pressure into the chamber of the hydraulic starting clutch 18, i.e., the clutch 18 is cooled and/or lubricated by the fluid which is supplied thereto by the jet pump 37. It is often desirable to provide in the outlet 43 a further valve 44 which can be identical with or similar to the valve 22 and serves to direct fluid from the outlet 43 of the jet pump 37 to the starting clutch 18 or to the direction reversing clutch 19. The operation of the valve 44 is also controlled by the electronic unit 24.

A portion of the fluid which is supplied by the jet pump 37 can be utilized to lubricate the transmission 2. Furthermore, the conduit 36 and/or the outlet 43 can supply fluid to one or more branch conduits (not shown) which contains or contain suitable flow restrictor means and serves or serve to deliver a cooling and/or lubricating fluid to one or more additional components of the power train 1 and/or other part(s) of the motor vehicle.

The suction pipe 40 of the jet pump 37 contains a check valve 45 which permits fluid to flow in one direction, i.e., from the reservoir 38 into the nozzle 41. The purpose of the check valve 45 is to prevent the flow of relatively cold and relatively viscous fluid from the jet pump 37 into the reservoir 38. When the temperature is low, losses in the jet pump 37 and in the associated conduits can be so high that the pump 37 is incapable of drawing additional fluid via suction pipe 40. Furthermore, low ambient temperature (i.e., high viscosity of the fluid) can adversely influence the operation of the jet pump 37. The check valve 45 ensures that the outlet 43 of the jet pump 37 receives at least that fluid which is supplied by the conduit 36.

The heretofore described parts of the power train 1 are or can be identical with or analogous to those shown and described in U.S. Pat. No. 5,667,448 to Friedmann.

FIG. 1 further shows a novel and improved fluid supplying assembly or unit 80 which serves to deliver fluid to the shafts of the sheaves between the respective pairs of flanges 3a, 3b and 4a, 4b. The unit 80 comprises a conduit 70 which acts as a spray pipe and receives pressurized fluid from the outlet of the pump 14 via conduit 72 and has one or more outlet ports or orifices 71, e.g., one orifice for each of the sheaves 3, 4. Such orifices are located between the two parallel or substantially parallel reaches of the chain 5 and serve to direct jets or sprays of fluid against two portions (75, 76) of the shafts forming part of the sheaves 3, 4 and being located between the respective flanges 3a, 3b and 4a, 4b. Of course, the orifices 71 can also direct some fluid directly against the conical inner sides or surfaces of the flanges 3a, 3b and 4a, 4b. The velocity of the fluid in the sprays or jets issuing from the orifices 71 can be regulated, e.g., in a manner to be described with reference to FIGS. 5a and 5b.

It will be seen that, in contrast to heretofore known proposals to supply fluid through the shafts of the sheaves, the unit 80 serves to supply fluid lubricant and/or coolant against the exposed sides of those portions (75, 76) of the shafts forming part of the sheaves 3, 4 which are located between the respective pairs of flanges 3a, 3b and 4a, 4b.

Figure 2:
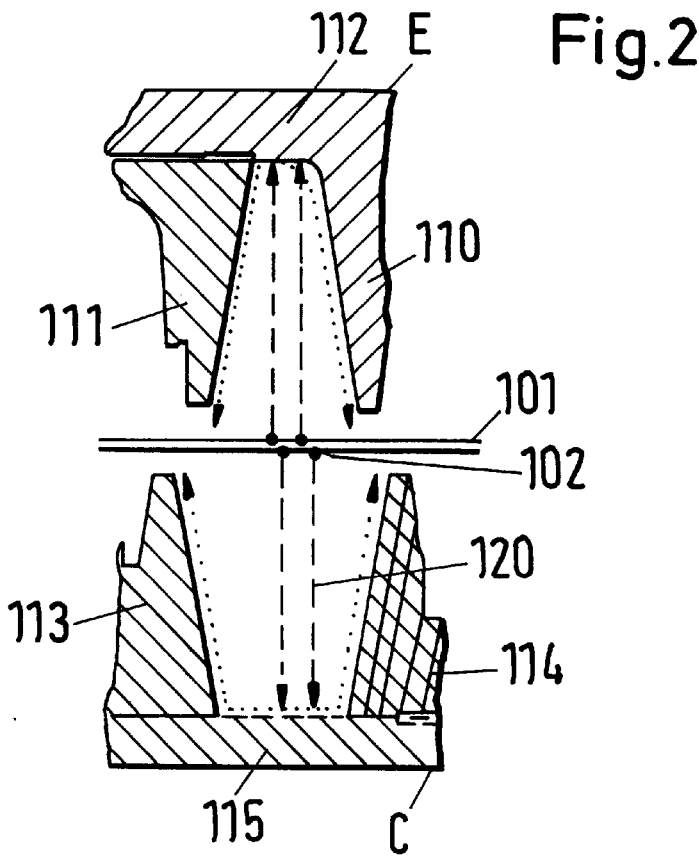
FIG. 2 is a fragmentary partly elevational and partly sectional view of two sheaves which receive a fluid coolant or lubricant from the orifices of a single conduit forming part of the fluid supplying unit.

FIG. 2 shows a conduit 101 which corresponds to the conduit 70 of the unit 80 of FIG. 1 and has outlet ports or orifices 102 for sprays 120 of fluid which is supplied to the conduit 101 by a source of pressurized fluid, e.g., the pump 14 of FIG. 1. If desired or necessary, the conduit 101 can contain a flow restrictor and/or a pressure regulating valve (not shown in FIG. 2). The sprays 120 can impinge solely upon those portions of the shafts 112, 115 which are located between the respective pairs of flanges 110, 111 and 113, 114 or upon such portions of the shafts 112, 115 as well as upon the adjacent confronting conical surfaces of the flanges. The fluid which impinges upon the shafts 112, 115 flows radially outwardly to lubricate and/or cool the conical surfaces of the respective pairs of flanges 110, 111 and 113, 114. Proper distribution of fluid which is supplied by the orifices 102 (and reaches the flanges 110, 111 and 113, 114) along the flanges is assisted by centrifugal force. This contributes to a highly satisfactory homogenization of supplied fluid and predictable (uniform) cooling and/or lubrication of the flanges 110, 111 and 113, 114.

Figure 3:
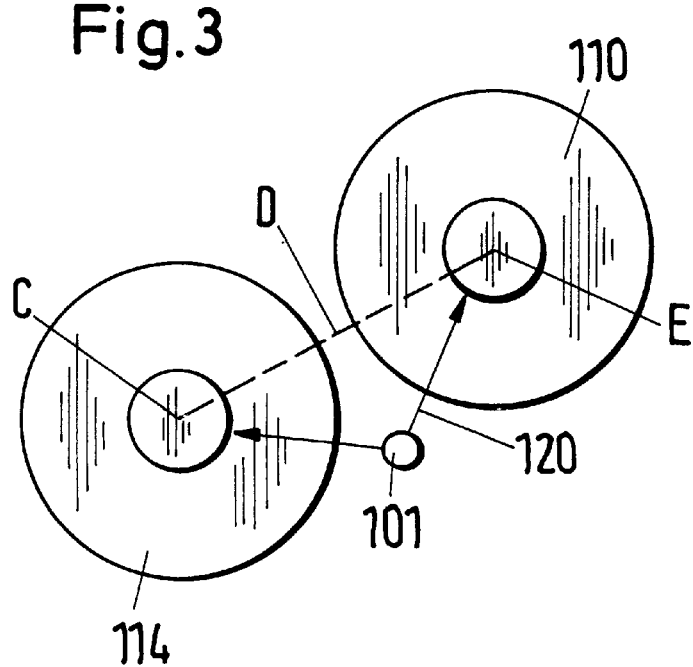
FIG. 3 is a smaller-scale schematic end elevational view of the sheaves and of the conduit shown in FIG. 2.

FIG. 3 shows the conduit 101, the two jets or sprays 120, the flanges 110, 114 of the two sheaves, the axes E, C of the two sheaves, and the (straight) line D denoting the shortest distance between the two axes. The conduit 101 is shown as being spaced apart from the line D; however, it is equally possible to place the conduit into close or immediate proximity of or onto the line D.

FIGS. 4a and 4a' show a fluid supplying conduit 201 with fluid spray discharging orifices 202, 203, 204 in such distribution that two orifices (202, 204) are located at one side and the third orifice (203) is located at the other side of a plane 207 including the axis of the conduit 201. The distance 206 of the centers of the orifices 202, 204 from the plane 207 is less than the distance 205 of the plane 207 from the center of the orifice 203. The orifices 202, 204 can be oriented to direct sprays of a fluid against the shaft of one of the sheaves, and the orifice 203 can be oriented to direct a spray of fluid against the shaft forming part of the other sheave.

FIGS. 4b and 4b' show a first modification wherein the center of a first orifice 211 is located on the central plane 214 of the conduit 210, and the center of a second orifice 212 is spaced apart from the plane 214 by a distance 213.

FIGS. 4c and 4c' show a conduit 220 with two orifices 221, 222 having their centers located on the central plane 223. A second conduit 220 can be provided for the other of the shafts forming part of two sheaves. The distance between the orifices 221, 222 (as seen in the axial direction of the conduit 220) is such that the sprays of fluid issuing from these orifices can impinge upon the shaft of a sheave between the respective flanges. The same can hold true for the orifices 202, 204 or for the orifices 202, 203, 204 shown in FIGS. 4a and 4a'.

FIGS. 4d and 4d' show a conduit 230 which can be utilized, for example, in lieu of the conduit 220 and has a single orifice 231 with a center in the plane 233 including the axis of the conduit 230.

It will be appreciated that FIGS. 4a to 4d' merely illustrate a few examples of the selection and/or distribution of orifices in a conduit forming part of a fluid supplying unit (such as 80) which embodies the present invention. Furthermore, the orifices or all of the orifices need not be round; for example, at least some of the orifices can be designed to provide oval passages for the flow of a pressurized fluid which is to form a jet or spray impinging upon the conical surfaces of two flanges and/or upon that portion of the shaft of the respective sheave which is located between the two flanges.

FIG. 5a is a fragmentary sectional view of a conduit 240 having an outlet port or orifice 241 which can discharge a jet or spray of a pressurized fluid lubricating and/or cooling agent, such as oil. The cross-sectional area of the orifice 241 is smaller than that of a passage 243 in a tubular extension or diaphragm 242 which receives fluid from the orifice 241 and converts it into a spray having a circular or other cross-section and impinging upon the shaft between the flanges of an adjustable sheave (not shown in FIG. 5a).

FIG. 5b shows a portion of a conduit 250 corresponding to the conduit 240 and having an orifice 251 serving to direct fluid coolant or lubricant into the passage 253 of an extension 252 which latter actually directs a spray of fluid against the shaft of a sheave, not shown. The cross-sectional area of the passage 253 is less than that of the orifice 251.

FIG. 5c illustrates a portion of a conduit 260 having an orifice 261 which supplies fluid to the passage 263 of a tubular exension 262. The cross-sectional area of the passage 263 equals or approximates that of the orifice 261.

The extension(s) 242, 252 and/or 262 is or are or can be exchangeable or interchangeable.

It has been found that the distribution of fluid on the component parts of a sheave is particularly satisfactory if the improved fluid supplying unit has at least one conduit (such as 70) with at least one orifice (such as 71) which directs a spray or shower or jet of fluid against the central part of the exposed portion (75 or 76) of a shaft when the transmission (such as 2) is set to transmit torque at an average rate (e.g., at least substantially midway between the maximum rate and zero rate), namely when the axially movable flange (such as 3a or 4a) is located at a predetermined axial distance from the other (axially fixed) flange (such as 3b or 4b).

An advantage of the extensions which are shown in FIGS. 5a, 5b and 5c is that the direction and/or the divergence of the spray or sprays can be regulated or selected with a high degree of accuracy, predictability and reproducibility. Moreover, the selected extension (refer again to FIGS. 5a and 5b) can determine or influence (in combination with the fluid pressure at the outlet of the pump 14 or at the outlet of another suitable source of pressurized fluid) the velocity of the fluid impinging upon the shaft of a sheave between the respective flanges.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of continuously variable speed transmissions for use in the power trains of motor vehicles and, therefore, such adaptations should and are intended to be comprehended within the meaning and range of equivalence of the appended claims.

What is claimed is:

1. A transmission comprising a first adjustable rotary sheave arranged to receive torque from a prime mover; a second adjustable rotary sheave arranged to receive torque from said first sheave by way of at least one endless flexible element which is trained over said sheaves, each of said sheaves having a shaft and two flanges non-rotatably connected to the respective shaft and each of said shafts having a portion between the respective flanges; at least one adjusting unit for each of said sheaves, said units being regulatable to vary the magnitude of the torque being transmitted between said at least one endless flexible element and said sheaves; and means for supplying a fluid to at least one of said shafts between the flanges of the respective sheave.

2. The transmission of claim 1, wherein said means for supplying includes means for delivering fluid to both shafts between the flanges of the respective sheaves.

3. The transmission of claim 1, wherein said means for supplying a fluid comprises at least one fluid conveying conduit having at least one orifice arranged to direct fluid toward said at least one shaft.

4. The transmission of claim 3, wherein said means for supplying a fluid further comprises means for determining the velocity of fluid which issues from said at least one orifice to impinge upon said at least one shaft.

5. The transmission of claim 4, wherein said means for supplying includes means for conveying fluid to both said shafts between the flanges of the respective sheaves, said conveying means having at least one fluid discharging orifice for each of said shafts and each of said orifices being arranged to direct fluid against the respective shaft.

6. The transmission of claim 5, wherein said means for supplying further comprises means for determining the velocity of fluid which issues from at least one of said orifices and impinges upon the respective shaft.

7. The transmission of claim 5, wherein said conveying means has a plurality of orifices for at least one of said shafts.

8. The transmission of claim 7, wherein said means for supplying further comprises means for determinig the velocity of fluid which issues from at least one of said plurality of orifices.

9. The transmission of claim 1, wherein said means for supplying a fluid comprises at least one fluid conveying conduit having at least one orifice arranged to direct fluid toward said at least one shaft, said at least one orifice having a first cross-sectional area and said means for supplying further comprising means for directing fluid from said orifice toward said at least one shaft, said means for directing having a second cross-sectional area smaller than said first cross-sectional area.

10. The transmission of claim 1, wherein said means for supplying a fluid comprises at least one fluid conveying conduit having at least one orifice arranged to direct fluid toward said at least one shaft, said at least one orifice having a first cross-sectional area and said means for supplying further comprising means for directing fluid from said orifice toward said at least one shaft, said means for directing having a second cross-sectional area larger than said first cross-sectional area.

11. The transmission of claim 1, wherein said means for supplying comprises a source of fluid and at least one conduit arranged to deliver fluid from said source toward said at least one shaft, said at least one conduit having at least one orifice arranged to direct fluid toward said at least one shaft.

12. The transmission of claim 11, wherein said source comprises at least one pump.

13. The transmission of claim 1, wherein the fluid is a coolant.

14. The transmission of claim 1, wherein the fluid is a lubricant.

15. The transmission of claim 1, wherein one flange of each of said sheaves is movable longitudinally of the respective shaft toward and away from the other flange of the respective sheave.

* * * * *

UNITED STATES PATENT AND TRADEMARK OFFICE
CERTIFICATE OF CORRECTION

PATENT NO.   :   6,068,565
DATED        :   May 30, 2000
INVENTOR(S)  :   Peter Riemer and Oswald Friedmann It is certified that errors appear in the above-identified patent and that said Letters Patent is hereby corrected as shown below:

Title page, [30] Foreign Application Priority Data should read as follows:

-- Nov. 25, 1997   [DE]   Germany.............. 197 52 079 --.

Signed and Sealed this

Twentieth Day of March, 2001

*Attest:*

NICHOLAS P. GODICI

*Attesting Officer*    Acting Director of the United States Patent and Trademark Office